US006239060B1

(12) United States Patent
Dockter et al.

(10) Patent No.: US 6,239,060 B1
(45) Date of Patent: May 29, 2001

(54) SUPPORTED METALLOCENE CATALYST SYSTEM AND METHOD FOR POLYMERIZING OLEFINS

(75) Inventors: David W. Dockter; Bryan E. Hauger; M. Bruce Welch; Randall S. Muninger, all of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/224,176

(22) Filed: Dec. 31, 1998

(51) Int. Cl.$^7$ .................................................... B01J 35/02
(52) U.S. Cl. ...................... 502/120; 502/108; 502/109; 526/160; 526/127; 526/129; 526/943; 526/130
(58) Field of Search .................................. 502/108, 120, 502/109; 526/160, 127, 129, 943, 130

(56) References Cited

U.S. PATENT DOCUMENTS

| | | |
|---|---|---|
| 4,404,344 | 9/1983 | Sinn et al. . |
| 4,565,795 | 1/1986 | Short et al. . |
| 4,874,734 | 10/1989 | Kioka et al. . |
| 5,324,800 | 6/1994 | Welborn, Jr. et al. . |
| 5,346,925 | 9/1994 | Sugano et al. . |
| 5,436,305 | 7/1995 | Alt et al. . |
| 5,455,366 | 10/1995 | Rohrmann et al. . |
| 5,486,575 | 1/1996 | Shroff . |
| 5,498,581 | 3/1996 | Welch et al. . |
| 5,571,880 | 11/1996 | Alt et al. . |
| 5,594,078 | 1/1997 | Welch et al. . |
| 5,635,437 | 6/1997 | Burkhardt et al. . |
| 5,654,454 | 8/1997 | Peifer et al. . |
| 5,688,734 * | 11/1997 | Speca et al. ......................... 502/108 |
| 5,705,578 * | 1/1998 | Peifer et al. ......................... 526/160 |
| 5,712,404 | 1/1998 | Peifer et al. . |
| 5,770,663 | 6/1998 | Peifer et al. . |
| 5,795,838 | 8/1998 | Tsutsui et al. . |
| 5,939,347 * | 8/1999 | Ward et al. ......................... 502/104 |

* cited by examiner

*Primary Examiner*—David W. Wu
*Assistant Examiner*—Ling-Siu Choi
(74) *Attorney, Agent, or Firm*—Edward L. Bowman

(57) ABSTRACT

The present invention provides a new type of supported metallocene catalyst system. In one aspect of the invention, an inorganic oxide support, such as silica, is impregnated with a Group XIII element such as B, Al or GA. The support is then contacted with a liquid catalyst system prepared by combining in a liquid an organo aluminoxane and a metallocene having two cyclopetadienyl-type ligands selected from substituted or unsubstituted cyclopentadienyl, indenyl, benzoindenyl, tetrahdroindenyl, benzofluorenyl, octahydrofluorenyl, and fluorenyl ligands to form a supported metallocene catalyst system. In preferred embodiments the process further includes conducting prepolymerization of at least one olefin in the presence of the supported metallocene catalyst system to produce a prepolymerized metallocene catalyst system. The prepolymerized metallocene catalyst system prepared in this manner yields substantially increased activity for the polymerization of olefins. In another aspect, the present invention also provides a method for polymerization of olefins using the inventive supported metallocene catalyst system.

18 Claims, No Drawings

SUPPORTED METALLOCENE CATALYST SYSTEM AND METHOD FOR POLYMERIZING OLEFINS

FIELD OF THE INVENTION

The present invention relates to a new type of supported metallocene catalyst system having a modified support useful for the polymerization of olefins. More particularly, but not by way of limitation, the present invention relates to a supported metallocene system having a support modified with a source of a Group XIII element. In another aspect the present invention relates to an method for polymerization of olefins using the inventive supported metallocene catalyst system.

BACKGROUND OF THE INVENTION

Metallocene catalyst systems are extensively used in a variety of polymerization systems, including the polymerization of olefins. The term "metallocene" as used herein refers to a derivative of cyclopentadienyl which is a metal derivative containing at least one cyclopentadienyl-type group which is bonded to a transition metal. The transition metal is selected from Groups IVB, VB, and VIB, preferably IVB and VIB. Examples include titanium, zirconium, hafnium, chromium and vanadium. Generally, the more preferred catalysts in the polymerization of olefins are metallocenes of Zr, Hf, or Ti.

Generally, in order to obtain the highest activity from metallocene catalysts, it has been necessary to use them with an organoaluminoxane cocatalyst, such as methylaluminoxane. This resulting catalyst system is generally referred to as a homogenous catalyst system since at least part of the metallocene or the organoaluminoxane is in solution in the polymerization media. These homogenous catalysts systems have the disadvantage that when they are used under slurry polymerization conditions, they produce polymer which sticks to reactor walls during the polymerization process (generally referred to as "fouling") and/or polymer having small particle size and low bulk density which limits the commercial utility.

Various methods have been proposed in an effort to overcome the disadvantages of the homogenous metallocene catalyst systems. Typically, these procedures have involved the prepolymerization of the metallocene aluminoxane catalyst system and/or supporting the catalyst system components on a porous carrier (also known as a "particulate solid" or "support").

Another important consideration in development of metallocene catalysts is the yield of solid polymer that is employed by employing a given quantity of catalyst in a given amount of time. This is know as the "activity" of the catalyst. There is an ongoing search for metallocene catalysts and techniques for preparing such catalysts which give improved activity for the polymerization of olefins. An evaluation of these catalysts and techniques has revealed that there is still room for improvement.

An object of the present invention is to provide a new method for preparing a supported metallocene catalyst system. In accordance with another aspect of the present invention, a method is provided for polymerizing olefins using the new type of supported metallocene catalyst system.

SUMMARY OF THE INVENTION

In one aspect, the present invention provides a process for preparing a supported metallocene catalyst system which includes the steps of impregnating a support selected from the group consisting of inorganic oxides with a source of an element selected from the group consisting of Group XIII elements; and contacting the support with a liquid catalyst system prepared by combining in a liquid an organo aluminoxane and a metallocene having two cyclopetadienyl-type ligands selected from substituted or unsubstituted cyclopentadienyl, indenyl, benzoindenyl, tetrahdroindenyl, benzofluorenyl, octahydrofluorenyl, and fluorenyl ligands to form a supported metallocene catalyst system. In preferred embodiments the process further includes conducting prepolymerization of at least one olefin in the presence of the supported metallocene catalyst system to produce a prepolymerized metallocene catalyst system. The prepolymerized metallocene catalyst system prepared in this manner yields substantially increased activity for the polymerization of olefins.

In another aspect, the present invention provides a process for polymerizing an olefin using the inventive supported metallocene catalyst system. The process includes the steps of: (a) impregnating a support selected from the group consisting of inorganic oxides with a source of an element selected from the group consisting of Group XIII elements; (b) contacting the support with a liquid catalyst system prepared by combining in a liquid an organo aluminoxane and a metallocene having two cyclopetadienyl-type ligands selected from substituted or unsubstituted cyclopentadienyl, indenyl, benzoindenyl, tetrahdroindenyl, benzofluorenyl, octahydrofluorenyl, and fluorenyl ligands to form a supported metallocene catalyst system; and (c) contacting the olefin with the supported metallocene catalyst system. In a preferred embodiment, the process further includes the step of conducting prepolymerization of at least one olefin in the presence of the supported metallocene catalyst system to produce a prepolymerized supported metallocene catalyst system prior to step (c).

In particularly preferred embodiments, the metallocene is a bridged metallocene having bis-indenyl, fluorenyl and fluorenyl-containing components.

These and various other features as well as advantages which characterize the present invention will be apparent from a reading of the following detailed description and a review of the appended claims.

DETAILED DESCRIPTION OF THE INVENTION

The present invention provides a particulate solid or "support," modified with a source of a Group XIII element, useful in forming a liquid catalyst system for the polymerization of olefins. Any number of supports can be employed as the particulate solid to be modified. Typically the support can be any inorganic oxide, including Groups II, III, IV or V metal oxides such as silica, alumina, silica-alumina, and mixtures thereof. Other examples of inorganic oxides are magnesia, titania, zirconia, and the like. It is within the scope of the present invention to use a mixture of one or more of the particulate solids.

In accordance with the present invention, the support is modified by impregnation to incipient wetness by drop-wise addition of a solution containing a source of an element selected from Group XIII of the Periodic Table of Elements, such as B, Al and Ga. In the preferred embodiment, impregnation is accomplished by drop-wise addition of the solution to incipient wetness; thus, the volume of solution added will be equal to or less than the pore volume of the support. In preferred embodiments, the solution used to modify the support will include a borate and/or a borate ester, such as boric acid, sodium tetraborate decahydrate ("borax") or trimethylborate. Various solvents may be used for the solution, including water and alcohols such as methanol, preferably methanol. If necessary, a small amount of acid can be used to ensure that the source of the Group XIII element is fully dissolved. The concentration of the solution serving as the boron source is sufficient to yield a boron loading of less than about 20 weight percent in the dried, modified support, preferably from about 0.1 to about 1.0 weight percent.

It is generally desirable for the solid to be thoroughly dehydrated prior to use. Preferably the solid is dehydrated so as to contain less that 1% loss on ignition. Thermal dehydration treatment may be carried out in vacuum or while purging with a dry inert gas such as nitrogen or dry air at a temperature of about 20° C. to about 1000° C., and preferably, from about 300° C. to about 800° C. Pressure considerations are not critical. The duration of thermal treatment can be from about 1 to about 24 hours. However, shorter or longer times can be employed provided equilibrium is established with the surface hydroxyl groups.

In a preferred embodiment, the above described thermal dehydration of the support is carried out by first drying the support in a vacuum oven and then calcining at a temperature of from about 400° C. to about 800° C. for about four hours.

Dehydration is preferably also accomplished by subjecting the solid to a -chemical treatment to remove water and reduce the concentration of surface hydroxyl groups. Chemical treatment is generally capable of converting all water and hydroxyl groups in the oxide surface to relatively inert species. Useful chemical agents are for example, trimethylaluminum, ethyl magnesium chloride, chlorosilanes such as $SiCl_4$, disilazane, trimethylchlorosilane, (dimethylamino)trimethylsilane and the like. Trimethylaluminum ("TMA") is a particularly preferred chemical agent.

The chemical dehydration can be accomplished by slurrying the inorganic particulate material such as, for example silica, in an inert low boiling hydrocarbon, such as for example, hexane. During the chemical dehydration treatment, the silica should be maintained in a moisture and oxygen free atmosphere. A low boiling inert hydrocarbon solution of the chemical dehydrating agent is then added to the silica slurry, such as, for example TMA. The solution is added slowly to the slurry. The temperature ranges during chemical dehydration reaction can be from about 20° C. to about 120° C., however, higher and lower temperatures can be employed. Preferably, the temperature will be from about 50° C. to about 100° C. The chemical dehydration procedure should be allowed to proceed until all the substantially reactive groups are removed from the particulate support material as indicated by cessation of gas evolution. Normally, the chemical dehydration reaction will be allowed to proceed from about 30 minutes to about 16 hours, preferably, 1 to 5 hours. Upon completion of the chemical dehydration, the solid particulate material may be filtered under a nitrogen atmosphere and washed one or more times with a dry, oxygen free inert solvent. The wash solvents as well as the diluents employed to form the slurry and the solution of chemical dehydrating agent can be any suitable inert hydrocarbon. Illustrative of such hydrocarbons are pentane, heptane, hexane, toluene, isopentane and the like.

The specific particle size of the support or inorganic oxide, surface area, pore volume, and number of hydroxyl groups is not considered critical to its utility in the practice of this invention. However, such characteristics often determine the amount of support to be employed in preparing the catalyst compositions, as well as affecting the particle morphology of polymers formed. The characteristics of the carrier or support must therefore be taken into consideration in choosing the same for use in the particular invention.

The modified support, prepared as described above, is useful in forming a supported metallocene catalyst system. The supported catalyst system is prepared by contacting the modified support material with a solution of a metallocene catalyst component which has been treated with an organo aluminoxane as described more fully below.

A wide range of metallocenes is considered to be applicable to the present process. Bridged metallocenes are preferred; however, the invention is considered applicable to unbridged metallocenes as well. The invention is general to iso-specific and syndio-specific metallocenes. The metallocenes of the type contemplated as useful for the present invention include those represented by the formula:

$$R_x(Z)(Z)MeQ_k$$

wherein each Z is bound to Me, is individually selected and is a cyclopentadienyl-type ligand selected from substituted or unsubstituted cyclopentadienyl, indenyl, benzoindenyl, tetrahydroindenyl, benzofluorenyl, octahydrofluorenyl, and fluorenyl ligands, as well as derivatives thereof;

wherein R is a structural bridge linking the Z's and is selected from the group consisting of hydrocarbyl groups, hydrocarboxy groups, silicon containing hydrocarbyl groups, germanium containing hydrocarbyl groups, tin containing hydrocarbyl groups, phosphorus containing hydrocarbyl groups, and nitrogen containing hydrocarbyl groups each having 1 to 20 carbon atoms;

wherein Me is a metal selected from the group consisting of Group 4, 5, and 6 metals of the Periodic Table;

wherein each Q is individually selected and is selected from the group consisting of hydrogen, halogens, hydrocarbyl groups having 1 to 20 carbon atoms, alkoxy groups having 1 to 20 carbon atoms, amino groups which may or may not be substituted with up to two hydrocarbyl groups having 1 to 20 carbon atoms, a phosphorus-containing hydrocarbyl group having 1 to 20 carbon atoms, a silicon-containing hydrocarbyl group having 1 to 20 carbon atoms and an aluminum-containing hydrocarbyl group having 1 to 20 carbon atoms;

wherein x is 1 or 0; and wherein k is a number sufficient to fill out the remaining valances of Me.

Particularly preferred metallocenes include bridged metallocenes having bis-indenyl, fluorenyl and fluorenyl-containing components and derivatives thereof. A bridging group between the cyclopentadienyl-type groups is within the scope of the present invention. Non-limiting examples of metallocenes having bis-indenyl components and methods for preparing such metallocenes are disclosed in U.S. Pat. No. 5,688,734 which is fully incorporated herein by reference. Non-limiting examples of bridged metallocenes having fluorenyl-containing components and methods for making same are disclosed in U.S. Pat. No. 5,594,078 which is fully incorporated herein by reference.

The term fluorenyl as used herein refers to 9-fluorenyl unless specifically indicated as otherwise. Accordingly, the term flourenyl and 9-fluorenyl should be viewed as equivalent unless indicated otherwise.

The organo aluminoxane component used in preparing the inventive solid catalyst system is an oligomeric aluminum compound having repeating units of the formula:

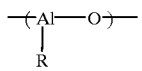

Some examples are often represented by the general formula (R—Al—O)$_n$ or R(R—Al—O—)$_n$ AlR$^2$. In the general aluminoxane formula, R is a C$_1$-C$_5$ alkyl radical, for example, methyl, ethyl, propyl, butyl or pentyl and "n" is an integer from 1 to about 50. Most preferably, R is methyl and "n" is at least 4. Aluminoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an aluminoxane. Generally the reaction of an aluminum alkyl with a limited amount of water is postulated to yield a mixture of the linear and cyclic species of the aluminoxane.

Before being contacted with the modified support, the metallocene and aluminoxane are combined in the presence of a suitable liquid to form a liquid catalyst system. The amount of aluminoxane and metallocene used in forming the liquid catalyst system can vary over a wide range. Typically, however, the molar ratio of aluminum in the aluminoxane to transition metal of the metallocene is in the range of about 1:1 to about 20,0000:1, more preferably, a molar ratio of about 50:1 to about 600:1 is used.

It is preferred that the liquid catalyst system be prepared using an organic liquid in which the aluminoxane is at least partially soluble. The currently preferred liquids are hydrocarbons such as hexane or toluene. Typically, an aromatic liquid solvent is employed. Examples include benzene, toluene, ethylbenzene, diethylbenzene, and the like. The amount of liquid to be employed is not particularly critical. Nevertheless, the amount should preferably be such as to dissolve the product of the reaction between the metallocene and the aluminoxane, to provide desirable polymerization viscosity for pre-polymerization, and to permit good mixing. The temperature is preferably kept below that which would cause the metallocene to decompose. Typically the temperature would be in the range of −50° C. to 100° C. Preferably, the metallocene, the aluminoxane, and the liquid diluent are combined at room temperature, i.e. around 100 to 30° C. The reaction between the aluminoxane and the metallocene is relatively rapid. The reaction rate can vary depending upon the ligands of the metallocene. It is generally desired that the aluminoxane and metallocene be contacted for about one minute to about one hour. Upon completion of the reaction, a liquid catalyst system will have been formed.

The liquid catalyst system is contacted with the modified support by mixing the liquid catalyst system with the above modified support. Preferably, the liquid catalyst is added to the support with vigorous stirring. The modified support is used in an amount such that the weight ratio of the metallocene to the support is in the range of about 0.00001/1 to 1/1, more preferably 0.005/1 to 0.05/1. The supported catalyst system is precipitated and washed with hexane or another suitable solvent. The catalyst system prepared in this manner to have a modified support yields polypropylene productivity increases of more than a factor of two.

Even further polypropylene productivity increases may be realized within the scope of the present invention by carrying out prepolymerization in the presence of the supported catalyst system. The prepolymerization is conducted in the supported catalyst system, which can be a solution, a slurry, or a gel in a liquid. Typically, the prepolymerization will be conducted using an olefin. A wide range of olefins can be used for the prepolymerization, preferably one selected from nonaromatic alpha-olefins, such as ethylene and propylene. It is within the scope of the invention to use a mixture of olefins, for example, ethylene and a higher alpha olefin can be used for prepolymerization. The use of a higher alpha olefin such as 1-butene with ethylene is believed to increase the amount of copolymerization occurring between the olefin monomer and the olefinically unsaturated portion of the metallocene.

The prepolymerization can be conducted under relatively mild conditions. Typically, this would involve using low pressures of the olefin and relatively low temperatures designed to prevent site decomposition resulting from high concentrations of localized heat. The prepolymerization typically occurs at temperatures in the range of about −30° C. to about +110° C., more preferably in the range of about +10° C. to about +30° C. The amount of prepolymer can be varied but typically would be in the range of from about 1 to about 95 wt. % of the resulting prepolymerized solid catalyst system, more preferably about 5 to 80 wt. %. It is generally desirable to carry out the prepolymerization to at least a point where substantially all of the metallocene is in the solid rather than in the liquid to maximize the use of the metallocene.

After prepolymerization, the resulting solid prepolymerized catalyst is separated from the liquid of the reaction mixture. Various techniques known in the art can be used for carrying out this step. After separating the solid from the liquid, the resulting solid is preferably washed with a hydrocarbon and then dried using high vacuum to remove substantially all the liquids and other volatile components that might still be associated with the solid. The vacuum drying is preferably carried out under relatively mild conditions, i.e. temperatures below 100° C. More typically the prepolymerized solid is dried by subjection to a high vacuum at a temperature of about 30° C. until a substantially constant weight is achieved. A preferred technique employs at least one initial wash with an aromatic hydrocarbon such as toluene, followed by a wash with a paraffinic hydrocarbon such as hexane, and then vacuum drying.

It is within the scope of the present invention to contact the prepolymerization reaction mixture product with a liquid in which the prepolymer is sparingly soluble, i.e. a counter solvent for the prepolymer, to help cause soluble prepolymer to precipitate from the solution. Such a liquid is also useful for the subsequent washing of the prepolymerized solid. The liquid mixture resulting from the prepolymerization of the inventive solid prepolymerized catalyst can be subjected to sonification to help break up particles if desired.

Further, if desired, the recovered solid prepolymerized catalyst system can be screened to give particles having sizes that meet the particular needs for a particular type of polymerization.

Another option is to combine the recovered inventive solid prepolymerized catalyst system with an inert hydrocarbon, such as one of the types used as a wash liquid, and then to remove that liquid using a vacuum. In such a process it is sometimes desirable to subject the resulting mixture to sonification before stripping off the liquid.

The resulting solid prepolymerized metallocene containing catalyst system is useful for the polymerization of olefins. Generally, it is not necessary to add any additional aluminoxane to this catalyst system. In some cases it may be found desirable to employ small amounts of an organaluminum compound as a scavenger for poisons. The term organaluminum compounds include compounds such as trimethylaluminum, trimethylaluminum, diethylaluminium chloride, ethylaluminum dichloride, ethylaluminum sesquichloride, and the like. Trialkyl aluminum compounds are currently preferred. Also in some applications it may be desirable to employ small amounts of antistatic agents which assist in preventing the agglomeration of polymer particles during polymerization. Still further, when the inventive catalyst system is added to a reactor as a slurry in a liquid, it is sometimes desirable to add a particulate dried solid as a flow aid for the slurry. Preferably the solid has been dried using one of the methods described earlier. Inorganic oxides such as silica or polyolefin "fluff" are particularly preferred. Currently, it is preferred to use a fumed silica such as that sold under the trade name Cab-o-sil. Generally the fumed silica is dried using heat and trimethylaluminum.

The solid catalyst system is particularly useful for the polymerization of alpha-olefins having 2 to 10 carbon atoms. Examples of such olefins include ethylene, propylene, butene-1, pentene-1, 3-methylbutene-1, hexenepropylene, 4-methylbutene-1, 3-methylpentene-1, heptene-1, octene-1, decene-1, 4,4-dimethyl-1-pentene, 4,4-diethyl-1-1hexene, 3,4-dimethyl-1-hexene, and the like and mixtures thereof. The catalysts are also useful for preparing copolymers of ethylene and propylene and copolymers of ethylene or propylene and one or more higher molecular weight olefins.

The polymerizations can be carded out under a wide range of conditions depending upon the particular metallocene employed and the particular results desired. Although the inventive catalyst system is a solid, it is considered that it is useful for polymerization conducted under solution, slurry, or gas phase reaction conditions.

When the polymerizations are carried out in the presence of liquid diluents obviously it is important to use diluents which do not have an adverse effect upon the catalyst system. Typical liquid diluents include propylene, propane, butane, isobutane, pentane, hexane, heptene, octane, cyclohexane, methylcyclohexane, toluene, xylene, and the like. Typically the polymerization temperature can vary over a wide range, temperatures typically would be in a range of about -60° C. to about 300° C., more preferably in the range of about 20° C. to about 160° C. Typically the pressure of the polymerization would be in the range of from about 1 to about 500 atmospheres or even greater. The inventive catalyst system is particularly useful for polymerizations carded out under particle form, i.e., slurry-type polymerization conditions.

The polymers produced with this invention have a wide range of uses that will be apparent to those skilled in the art from the physical properties of the respective polymers. Applications such as molding, films, adhesives, and the like are indicated.

EXAMPLES

A further understanding of the present invention, its various aspects, objects and advantages will be provided by the following examples.

All preparations for experiments were carded out in nitrogen purged dry boxes. All solvents were purchased from commercial sources and dried over activated alumina. Trimethylaluminum (TMA) was purchase as a 2.0 M or 15 wt. % solution in toluene from commercial sources. Methylaluminoxane (MAO) was purchased from commercial sources as a 10 or 30 wt. % solution in toluene. The silica used was either Davison 948 or Davison 953 as specified and was dehydrated in a nitrogen stream at the temperature indicated.

The polymerization procedure was as follows. The catalyst samples were placed in a clean, dry one gallon autoclave which had been flushed with nitrogen. The reactor was closed and filled with approximately two-thirds of a gallon of propylene and the temperature was rapidly raised to the desired polymerization temperature. After one hour, excess propylene was vented and the reactor was cooled. The polymer was then removed and dried. The results of the polymerization analysis of each example are summarized in Table 1 following the examples.

Melt Flow determinations were made according to ASTM Method D1238-95.

Example 1

20% Borax/Water Modified Silica

In this run, a modified silica support was prepared by addition of 6.4 g of sodium tetraborate decahydrate ("borax") to 53 ml of 60° C. water with vigorous stirring. Concentrated HCl was slowly added drop-wise until all solids were dissolved. Approximately 2 ml of HCl were added in total. This solution was added drop-wise to 32.9 g of uncalcined Davison 948 Silica, with vigorous stirring between each addition of solution. This solid was then placed in a vacuum oven at 110° C. for an hour. The solid was then suspended in 500 ml of isopropanol, filtered, and placed back in the same oven overnight. The solid was sieved through a 100-mesh sieve, then calcined in air at 800° C. This solid was then stored under nitrogen.

The silica was slurried by addition of 900 ml of anhydrous toluene to 200 g of the above modified silica. With stirring, 110 ml of 2.0 M trimethylaluminum (TMA) in toluene was added to this slurry. The solution was allowed to stir for one hour. The silica was allowed to settle, and the liquid decanted. This solid was washed with hexane and dried overnight under vacuum.

Next, 110.8 ml of 10 wt. % methylaluminoxane ("MAO") were added to 0.1438 g (rac-dimethylsily bis (2-methylindenyl)) zirconium dichloride and stirred. This solution was added to 2.56 g of the modified silica support described above. After stirring for 5 minutes, 100 ml of hexane were added to precipitate the metallocene and MAO. This suspension was filtered and washed with three 70 ml aliquots of hexane, then dried overnight at high vacuum. This yielded 2.56 g of isolated solid.

Example 2

20% Borax/Methanol Modified Silica

In this run, a modified silica support was prepared by addition of 7.0 g of borax to 56 ml of 40° C. methanol with vigorous stirring. Concentrated HCl was then slowly added drop-wise until all solids were dissolved. Approximately 4 ml of HCl were added in total. This solution was then added drop-wise to uncalcined Davison 948 Silica, with vigorous stirring between each addition of solution. This solid was then placed in a vacuum oven at 110° C. overnight. The solid was sieved through a 100-mesh sieve, then calcined in air at 800° C. This solid was then stored under nitrogen.

The silica was slurried by addition of 900 ml of anhydrous toluene to 200 g of the above modified silica. With stirring, 110 ml of 2.0 M TMA in toluene was added to this slurry. The solution was allowed to stir for one hour. The silica was allowed to settle, and the liquid decanted. This solid was washed with hexane and dried overnight under vacuum.

Next, 19.8 ml of 10 wt. % MAO were added to 0.066g (rac-dimethylsily bis (2-methylindenyl)) zirconium dichloride and stirred. This solution was added to 1.32 g of the Borax/Methanol modified and TMA treated silica described above. After stirring for 5 minutes, 100ml of hexane were added to precipitate the metallocene and MAO. This suspension was filtered and washed with two 70 mL aliquots of hexane, then dried overnight at high vacuum. This yielded 2.10 g of isolated solid.

Example 3

0.1% Borax/Methanol Modified Silica

In this run, a modified silica support was prepared by addition of 300 ml of 50° C. methanol to 0.2 g of borax with vigorous stirring. The solution was stirred until all solids were dissolved; no addition of HCl was necessary. This solution was added drop-wise to 200 g of uncalcined Davison 953 Silica, stirring between each addition of solution. This solid was then placed in a vacuum oven at 73° C. overnight (about 16 hours). The solid was sieved through a 100-mesh sieve, then calcined in air at 800° C. This solid was then stored under nitrogen.

The silica was slurried by addition of 10 ml of anhydrous toluene to 2.5 g of the previously modified silica. While stirring, 5 ml of 15 wt. % TMA in toluene was added to this slurry. The solution was stirred for one and one-half hours. The solution was then filtered and washed with one 10 ml aliquot of toluene and one 10 ml aliquot of hexane. The solid was dried overnight under vacuum. As a result, 5.57 g of product were recovered.

Next, 1.984 ml of 30% MAO (Albemarle) in toluene was added to 1.24 g of the above modified silica support. This slurry was allowed to stir and then 0.062 g of (rac-dimethylsily bis (2-methylindenyl)) zirconium dichloride dissolved in 1 ml of 30 wt. % MAO (Albemarle) were added. A second aliquot of 30 wt. % MAO was used to completely transfer the metallocene to the silica suspension. The suspension with the metallocene was then vigorously stirred with a spatula and then dried under vacuum overnight. This yielded 1.88 g of solid.

Comparative Example 4

Unmodified Silica

Calcined Davison 953 Silica was purchased calcined in air at 800° C. To slurry the silica, 900 ml of anhydrous toluene were added to 200 g of this. With stirring, 110 ml of 2.0 M TMA in toluene was added to this slurry. The temperature was raised to 45° C. and the solution allowed to stir for one hour. The silica was allowed to settle, the liquid was decanted and the solid was dried overnight under vacuum.

Next, 2.36 ml of 30% MAO (Albemarle) in toluene were added to 1.472 g of the above silica support. After stirring, 0.0736 g of (rac-dimethylsily bis (2-methylindenyl)) zirconium dichloride dissolved in 1 ml of 30 wt. % MAO (Albemarle) were added. A second aliquot of 30 wt. % MAO was used to completely transfer the metallocene to the silica suspension. The suspension with the metallocene was then vigorously stirred with a spatula and dried under vacuum overnight (about 18 hours). This yielded 3.14 g of recovered solid.

Example 5

1.0% Borax/Methanol Modified Silica

In this run, 2.0 g of borax was added to 300 ml of 50° C. methanol with vigorous stirring. The solution was stirred until all solids were dissolved (no HCl was necessary). This solution was added drop-wise to 200 grams of uncalcined Davison 953 Silica, stirring between each addition of solution. This solid was then placed in a vacuum oven at 73° C. overnight (16 hours). The solid was sieved through a 100-mesh sieve, calcined in air at 800° C. and then stored under nitrogen.

Next, 10 ml of anhydrous toluene was added to 2.5 g of the previously modified silica to slurry the silica. With stirring, 5 ml of 15 wt. % TMA in toluene were added to this slurry and stirred for one and one-half hours. The solution was then filtered and washed with one 10 ml aliquot of toluene and one 10 ml aliquot of hexane. The solid was dried overnight under vacuum. As a result, 4.31 g of product were recovered.

Next, 3.01 ml of 30 wt. % MAO (Albemarle) in toluene were added to 1.87 g of the above silica support, forming a slurry. After stirring, 0.0938 g of (rac-dimethylsily bis (2-methyl-4,5-Benzoindenyl)) zirconium dichloride dissolved in 1 ml of 30 wt. % MAO (Albemarle) were added to this slurry. A second aliquot of 30 wt. % MAO was used to completely transfer the metallocene to the silica suspension. The suspension with the metallocene was then vigorously stirred with a spatula and dried under vacuum overnight. This yielded 2.60 g of solid.

Example 6

10% Borax/Methanol Modified Silica

In this run, 300 ml of 50° C. methanol were added 20 g of borax with vigorous stirring. Concentrated HCl was slowly added drop-wise until all solids were dissolved. Approximately 0.5 ml total of HCl were added. This solution was then added drop-wise to 200 grams of uncalcined Davison 953 Silica, stirring between each addition of solution. This solid was then placed in a vacuum oven at 73° C. overnight (16 hours). The solid was sieved through a 100-mesh sieve, calcined in air at 800° C. and then stored under nitrogen.

Next, 10 ml of anhydrous toluene were added to 2.5 g of the previously modified silica to slurry the silica. While stirring, 5 ml of 15 wt. % TMA in toluene were added to this slurry and stirred for one and one-half hours. The solution was then filtered and washed with one 10 ml aliquot of toluene and one 10 ml aliquot of hexane and dried overnight under vacuum. In total, 1.25 g of product were recovered.

Next, 2.48 ml of 30 wt. % MAO (Albemarle) in toluene were added to 1.55 g of the above modified silica support, forming a slurry. After stirring, 0.0775 g of (rac-dimethylsily bis (2-methyl-4,5-Benzoindenyl)) zirconium dichloride dissolved in 1 ml of 30 wt. % MAO (Albemarle) were added to this slurry. A second aliquot of 30 wt. % MAO was used to completely transfer the metallocene to the silica suspension. The suspension with the metallocene was then vigorously stirred with a spatula and dried under vacuum overnight. This yielded 2.86 g of solid.

Comparative Example 7

Unmodified Silica (Control)

Calcined Davison 953 Silica was purchased calcined in air at 800° C. To slurry the silica, 900 ml of anhydrous toluene was added to 200 g of this silica. With stirring, 110 ml of 2.0 M TMA in toluene was added to this slurry. The temperature was raised to 45° C. and the solution allowed to stir for one hour. The silica was allowed to settle, the liquid was decanted and the solid was dried overnight under vacuum.

Next, 1.868 g of the above silica support were added to 0.0934 (rac-dimethylsily bis (2-methyl-4,5-Benzoindenyl) zirconium). After stirring, 3.0 ml of 30 wt. % MAO (Albemarle) in toluene were added and the slurry was stirred well. This mixture was dried under vacuum overnight, yielding 2.62 g of solid.

Example 8

1.0% Borax/Methanol Modified Silica

In this run, 2.0 g of borax were added to 300 ml of 50° C. methanol with vigorous stirring. The solution was stirred until all solids were dissolved (no HCl was necessary). This solution was added drop-wise to 200 grams of uncalcined Davison 953 Silica, stirring between each addition of solution. The solid was then placed in a vacuum oven at 73° C. overnight (16 hours). The solid was sieved through a 100-mesh sieve, then calcined in air at 800° C. This solid was then stored under nitrogen.

Next, 10 ml of anhydrous toluene was added to 2.5 g of the previously modified silica to slurry the silica. While stirring, 5 ml of 15 wt. % TMA in toluene were added to this slurry. The solution stirred for one and one-half hours. The solution was then filtered and washed with one 10 ml aliquot of toluene and one 10 ml aliquot of hexane. The solid was dried overnight under vacuum. As a result 4.31 g of product was recovered.

Next, 0.60 g of the above silica support, 91.3 ml of 10% MAO (Witco) in toluene, and 0.28 g of (rac-dimethylsily bis (2-methyl-4,5-Benzoindenyl)) zirconium dichloride were mixed together. This slurry was allowed to stir for 20 minutes under a nitrogen atmosphere at room temperature. After this period of stirring, the temperature of the solution was reduced to 8° C., and a 5 psi overpressure of propylene was added to the reaction flask. The reaction flask was then stirred at a temperature of 8 to 14° C. and the weight of the flask monitored to judge the uptake of propylene. When the weight gained by the flask equaled 0.41 g (approximately equal to the weight of the silica used) the source of propylene was disconnected from the flask. The solution was then filtered at room temperature and washed with three 10 ml portions of dry pentane, then dried under vacuum overnight. In total, 3.67 g of solid were recovered.

Comparative Example 9

Unmodified Silica with Prepolymer (Control)

Calcined Davison 953 Silica was purchased calcined in air at 800° C. Then 900 ml of anhydrous toluene were added to 200 g of this silica to slurry the silica. While stirring, 110 ml of 2.0 M TMA in toluene were added to the slurry. The temperature was raised to 45° C. and the solution allowed to stir for one hour. The silica was allowed to settle, and the liquid decanted. This solid was dried overnight under vacuum.

Next, 0.60g of the above silica support, 91.3 ml of 10% MAO (Witco) in toluene, and 0.27 g of (rac-dimethylsily bis (2-methyl-4,5-Benzoindenyl)) zirconium dichloride were mixed together. This slurry was allowed to stir for 20 minutes under a nitrogen atmosphere at room temperature. After this period of stirring, the temperature of the solution was reduced to 8° C., and a 5 psi overpressure of propylene was added to the reaction flask. The reaction flask was then stirred at a temperature of 8 to 12° C. and the weight of the flask monitored to judge the uptake of propylene. When the weight gained by the flask equaled 0.63 g (approximately equal to the weight of the silica used) the source of propylene was disconnected from the flask. The solution was then filtered at room temperature and washed with three 10 ml portions of dry pentane, then dried under vacuum overnight. In total, 3.92 g of solid were recovered.

Summary of Examples

A summary of the results of the above examples is provided in the following table:

TABLE 1

Polymerization Analysis of Solids

| Example | Catalyst | Temp | H2/C2 | g/g cat | g PP/g Zr · h | MF |
|---|---|---|---|---|---|---|
| Example 1 | A | 80 | 0 | 405 | 150,167 | 39.6 |
| Example 2 | A | 80 | 0 | 1971 | 757,989 | 58.2 |
| Example 3 | A | 80 | 0 | 1452 | 277,170 | 94.9 |
| Example 4* | A | 80 | 0 | 802 | 189,705 | 75.3 |
| Example 5 | B | 80 | 0 | 1041 | 290,684 | 31.2 |
| Example 6 | B | 80 | 0 | 877 | 226,651 | 38.2 |
| Example 7* | B | 80 | 0 | 791 | 163,078 | nm |
| Example 8 | B | 80 | 0 | 5,649 | 2,403,634 | 49 |
| Example 9 | B | 80 | 0 | 4,862 | 2,170,607 | 46 |

*Comparative Example
A = (rac-dimethylsily bis (2-methylindenyl)) zirconium dichloride
B = (rac-dimethylsily bis (2-methyl-4,5-Benzoindenyl)) zirconium dichloride Table 1 clearly demonstrates the increased activity of metallocenes prepared in accordance with the present invention. It should also be noted that the modified supports of the present invention change the effect of hydrogen on the metallocene. At the same hydrogen concentration, a lower or higher melt flow polymer is produced depending on the boron source used.

It will be clear that the present invention is well adapted to attain the ends and advantages mentioned as well as those inherent therein. While presently preferred embodiments have been described for purposes of disclosure, numerous changes may be made which will readily suggest themselves to those skilled in the art and which are encompassed in the spirit of the invention disclosed and as defined in the appended claims.

That which is claimed is:

1. A process for preparing a supported metallocene catalyst system comprising the steps of:
   (a) impregnating a support selected from the group consisting of inorganic oxides with an alcohol solution of a boron compound selected from the group consisting of boric acid, sodium tetraborate decahydrate, and trimethylborate, drying, and dehydrating the impregnated support; and
   (b) contacting the support with a liquid catalyst system prepared by combining in a liquid an organo aluminoxane and a metallocene having two cyclopentadienyl-type ligands selected from substituted or unsubstituted cyclopentadienyl, indenyl, benzoindenyl, tetrahydroindenyl, benzofluorenyl, octahydrofluorenyl, and fluorenyl ligands to form a supported metallocene catalyst system.

2. The process of claim 1 wherein the dehydration step comprises the steps of:
   thermally dehydrating the impregnated support; and
   chemically dehydrating the thermally dehydrated support by treatment with a chemical agent.

3. The process of claim 2 wherein the step of thermally dehydrating the impregnated support comprises calcining.

4. The process of claim 3 wherein the chemical agent is selected from the group consisting of trimethylaluminum, ethyl magnesium chloride, and chlorosilanes.

5. The process of claim 4 wherein the chemical agent is trimethylaluminum.

6. The process of claim 5 wherein the metallocene is selected from the group consisting of metallocenes which are in accordance with the formula $$R_x(Z)(Z)MeQ_k$$

wherein each Z is bound to Me, is individually selected and is a cyclopentadienyl-type ligand selected from substituted or unsubstituted cyclopentadienyl, indenyl, benzoindenyl, tetrahydroindenyl, benzofluorenyl, octahydrofluorenyl, and fluorenyl ligands, as well as derivatives thereof;

wherein R is a structural bridge linking the Z's and is selected from the group consisting of hydrocarbyl groups, hydrocarboxy groups, silicon containing hydrocarbyl groups, germanium containing hydrocarbyl groups, tin containing hydrocarbyl groups, phosphorus containing hydrocarbyl groups, and nitrogen containing hydrocarbyl groups each having 1 to 20 carbon atoms;

wherein Me is a metal selected from the group consisting of Group 4, 5, and 6 metals of the Periodic Table;

wherein each Q is individually selected and is selected from the group consisting of hydrogen, halogens, hydrocarbyl groups having 1 to 20 carbon atoms, alkoxy groups having 1 to 20 carbon atoms, amino groups which may or may not be substituted with up to two hydrocarbyl groups having 1 to 20 carbon atoms, a phosphorus-containing hydrocarbyl group having 1 to 20 carbon atoms, a silicon-containing hydrocarbyl group having 1 to 20 carbon atoms and an aluminum-containing hydrocarbyl group having 1 to 20 carbon atoms;

wherein x is 1 or 0; and wherein k is a number sufficient to fill out the remaining valances of Me.

7. The process of claim 4 wherein the metallocene is further selected from the group consisting of bridged metallocenes having indenyl and fluorenyl-containing components.

8. The process of claim 4 wherein the organo aluminoxane is selected from the group consisting of oligomeric aluminum compounds having repeating units of the formula

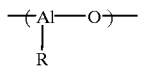

wherein R is a $C_1$-$C_5$ alkyl radical.

9. The process of claim 6 wherein the organo aluminoxane is methylaluminoxane.

10. A process according to claim 9 wherein the metallocene is selected from (rac-dimethylsilyl bis(2-methylindenyl)) zirconium dichloride and (rac-dimethylsilyl bis(2-methyl-2,5-benzoindenyl)) zirconium dichloride.

11. A process for preparing a supported metallocene catalyst system comprising the steps of:

(a) impregnating a support selected from the group consisting of inorganic oxides with an alcohol solution of a boron compound selected from the group consisting of boric acid, sodium tetraborate decahydrate, and trimethylborate, the impregnated support; and (b) dehydrating the impregnated support;

(c) contacting the support with a liquid catalyst system prepared by combining in a liquid an organo aluminoxane and a metallocene having two cyclopentadienyl-type ligands selected from substituted or unsubstituted cyclopentadienyl, indenyl, benzoindenyl, tetrahydroindenyl, benzofluorenyl, octahydrofluorenyl, and fluorenyl ligands to form a supported metallocene catalyst system;

(d) conducting prepolymerization in a reaction liquid of an olefin in the presence of the supported metallocene catalyst system to produce a solid prepolymerized supported metallocene catalyst system; and (e) separating the solid prepolymerized supported metallocene catalyst system from the reaction liquid.

12. The process of claim 11 wherein the step of thermally dehydrating the impregnated support comprises calcining.

13. The process of claim 12 wherein the dehydrating step (b) comprises the steps of:

thermally dehydrating the impregnated support; and chemically dehydrating the thermally dehydrated support by treatment with a chemical agent.

14. The process of claim 12 wherein the chemical agent is selected from the group consisting of trimethylaluminum, ethyl magnesium chloride, and chlorosilanes.

15. The process of claim 14 wherein the metallocene is selected from the group consisting of metallocenes which are in accordance with the formula

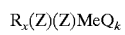

wherein each Z is bound to Me, is individually selected and is a cyclopentadienyl-type ligand selected from substituted or unsubstituted cyclopentadienyl, indenyl, benzoindenyl, tetrahydroindenyl, benzofluorenyl, octahydrofluorenyl, and fluorenyl ligands, as well as derivatives thereof;

wherein R is a structural bridge linking the Z's and is selected from the group consisting of hydrocarbyl groups, hydrocarboxy groups, silicon containing hydrocarbyl groups, germanium containing hydrocarbyl groups, tin containing hydrocarbyl groups, phosphorus containing hydrocarbyl groups, and nitrogen containing hydrocarbyl groups each having 1 to 20 carbon atoms;

wherein Me is a metal selected from the group consisting of Group 4, 5, and 6 metals of the Periodic Table;

wherein each Q is individually selected and is selected from the group consisting of hydrogen, halogens, hydrocarbyl groups having 1 to 20 carbon atoms, alkoxy groups having 1 to 20 carbon atoms, amino groups which may or may not be substituted with up to two hydrocarbyl groups having 1 to 20 carbon atoms, a phosphorus-containing hydrocarbyl group having 1 to 20 carbon atoms, a silicon-containing hydrocarbyl group having 1 to 20 carbon atoms and an aluminum-containing hydrocarbyl group having 1 to 20 carbon atoms;

wherein x is 1 or 0; and wherein k is a number sufficient to fill out the remaining valances of Me.

16. The process of claim 15 wherein the organo aluminoxane is selected from the group consisting of oligomeric aluminum compounds having repeating units of the formula

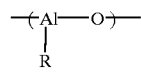

wherein R is a $C_1$-$C_5$ alkyl radical.

17. The process of claim 16 wherein the metallocene is further selected from the group consisting of bridged metallocenes having indenyl and fluorenyl-containing components.

18. A process according to claim 16 wherein the metallocene is selected from (rac-dimethylsilyl bis(2-methylindenyl)) zirconium dichloride and (rac-dimethylsilyl bis(2-methyl-2,5-benzoindenyl)) zirconium dichloride.

* * * * *